(No Model.)

J. F. LEIGHTON.
COMBINED SHIRT STUD AND MAGNIFYING GLASS.

No. 353,688. Patented Dec. 7, 1886.

WITNESSES
S. L. Schrader
Edwin Sauter

INVENTOR
James F. Leighton
by Paul Bakewell
attorney.

N. PETERS, Photo-Lithographer, Washington, D. C.

UNITED STATES PATENT OFFICE.

JAMES F. LEIGHTON, OF ST. LOUIS, MISSOURI.

COMBINED SHIRT-STUD AND MAGNIFYING-GLASS.

SPECIFICATION forming part of Letters Patent No. 353,688, dated December 7, 1886.

Application filed August 7, 1886. Serial No. 210,292. (No model.)

*To all whom it may concern:*

Be it known that I, JAMES F. LEIGHTON, a citizen of the United States, residing at the city of St. Louis, State of Missouri, have invented a certain new and useful Improved Combined Shirt-Stud and Magnifying-Glass, of which the following is a full, clear, and exact description.

My invention relates to an improved arrangement of shirt-stud, and has for its object to enable a shirt-stud to be used also as an optical instrument for viewing and magnifying photographic portraits and other pictures, or geological, entomological, botanical, or other objects mounted or placed therein.

Figure 1:
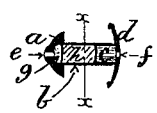
Figure 2:
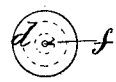
Figure 3:
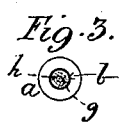

On the accompanying drawings, Figure 1 is a longitudinal section of a shirt-stud embodying my invention; Fig. 2, an end view thereof; and Fig. 3, a transverse section on line $x$ $x$ in Fig. 1, like letters of reference denoting like parts in all the figures.

$a$ represents the small button end of a shirt-stud, from which projects centrally the tubular stem or shank $b$, for receiving longitudinally the tubular stem or shank $c$, projecting centrally from the large button end $d$ of the shirt-stud. Through the centers of buttons $a$ and $b$ are formed sight-holes $e f$, respectively, which are in line with each other and with the longitudinal center line of the combined tubular stems or shanks $b$ $c$.

In the tubular stem of shank $b$ is placed, against the inside of the button $a$, the glass $g$, or other transparent material, whereon is mounted the miniature photograph, picture, or other object to be viewed, between which and the large button end $d$ of the shirt-stud is placed a magnifying-lens, $h$, held in place against the picture or object by the edge of the inserted tubular stem or shank $c$.

On looking through the central hole, $f$, of the large button end $d$ of the shirt-stud, the portrait, picture, or other object will be seen greatly magnified.

If desired, the shirt-stud may be disconnected and another picture or object substituted.

I claim as my invention—

A button consisting of the head $a$, provided with the central hole, $e$, and glass-bearing picture $g$, the shoe $d$, also provided with the central hole, $f$, and the tubular shank $b$, provided with the lens $h$, substantially as specified.

In testimony whereof I affix my signature, in presence of two witnesses, this 31st day of July, 1886.

JAMES F. LEIGHTON.

Witnesses:
S. L. SCHRADER,
PAUL BAKEWELL.